(12) United States Patent
Mandapati

(10) Patent No.: US 9,338,184 B1
(45) Date of Patent: May 10, 2016

(54) SYSTEMS, METHODS, AND SOFTWARE FOR IMPROVING RESISTANCE TO DISTRIBUTED DENIAL OF SERVICE ATTACKS

(71) Applicant: Sprint Communications Company L.P., Overland Park, KS (US)

(72) Inventor: Rajasekhar R. Mandapati, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 91 days.

(21) Appl. No.: 14/203,926

(22) Filed: Mar. 11, 2014

(51) Int. Cl.
*H04L 29/06* (2006.01)
*H04L 29/12* (2006.01)

(52) U.S. Cl.
CPC ........ *H04L 63/1458* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 6,411,966 B1 | 6/2002 | Kwan et al. | |
| 7,600,042 B2 | 10/2009 | Lemson et al. | |
| 8,261,351 B1* | 9/2012 | Thornewell et al. | 726/23 |
| 8,495,717 B1* | 7/2013 | Beacham et al. | 726/7 |
| 2004/0039798 A1 | 2/2004 | Hotz et al. | |
| 2006/0075084 A1* | 4/2006 | Lyon | 709/223 |
| 2006/0112176 A1* | 5/2006 | Liu et al. | 709/223 |
| 2009/0262741 A1* | 10/2009 | Jungck et al. | 370/392 |
| 2014/0096194 A1* | 4/2014 | Bhogavilli et al. | 726/3 |
| 2014/0344925 A1* | 11/2014 | Muthiah | 726/22 |
| 2015/0058976 A1* | 2/2015 | Carney et al. | 726/22 |

FOREIGN PATENT DOCUMENTS

WO 0052594 9/2000

OTHER PUBLICATIONS

Subramani rao Sridhar rao, Denial of Service attacks amd mitigation techniques: Real time implementation with detailed analysis, 20011, The SANS Institute, Information Security Reading Room site, pp. 1-48.*
Olivier Paul, An overview of Denial of Service Issues and Solutions in operator networks, 2011, RST department/TSP, retrieved from http://www-lor.int-evry.fr/~paul_o/Course/DDOS.pdf, pp. 1-78.*

* cited by examiner

*Primary Examiner* — Kaveh Abrishamkar
*Assistant Examiner* — Adrian Stoica

(57) ABSTRACT

In an embodiment, a method provides for handling service attacks in an application server, including detecting a service attack from a user element, receiving a service request from the user element that includes an Internet protocol address, and in response, sending a first name request to the user element for a service name associated with the user element. The method also includes receiving a response to the first name request that includes a service name from the user element, and sending a second name request to a first domain name server for the service name associated with the Internet protocol address of the user element. The method further includes receiving a second response from the first domain name server that includes a stored service name associated with the user element, and comparing the service name to the stored service name to determine whether or not to allow the service request.

20 Claims, 8 Drawing Sheets

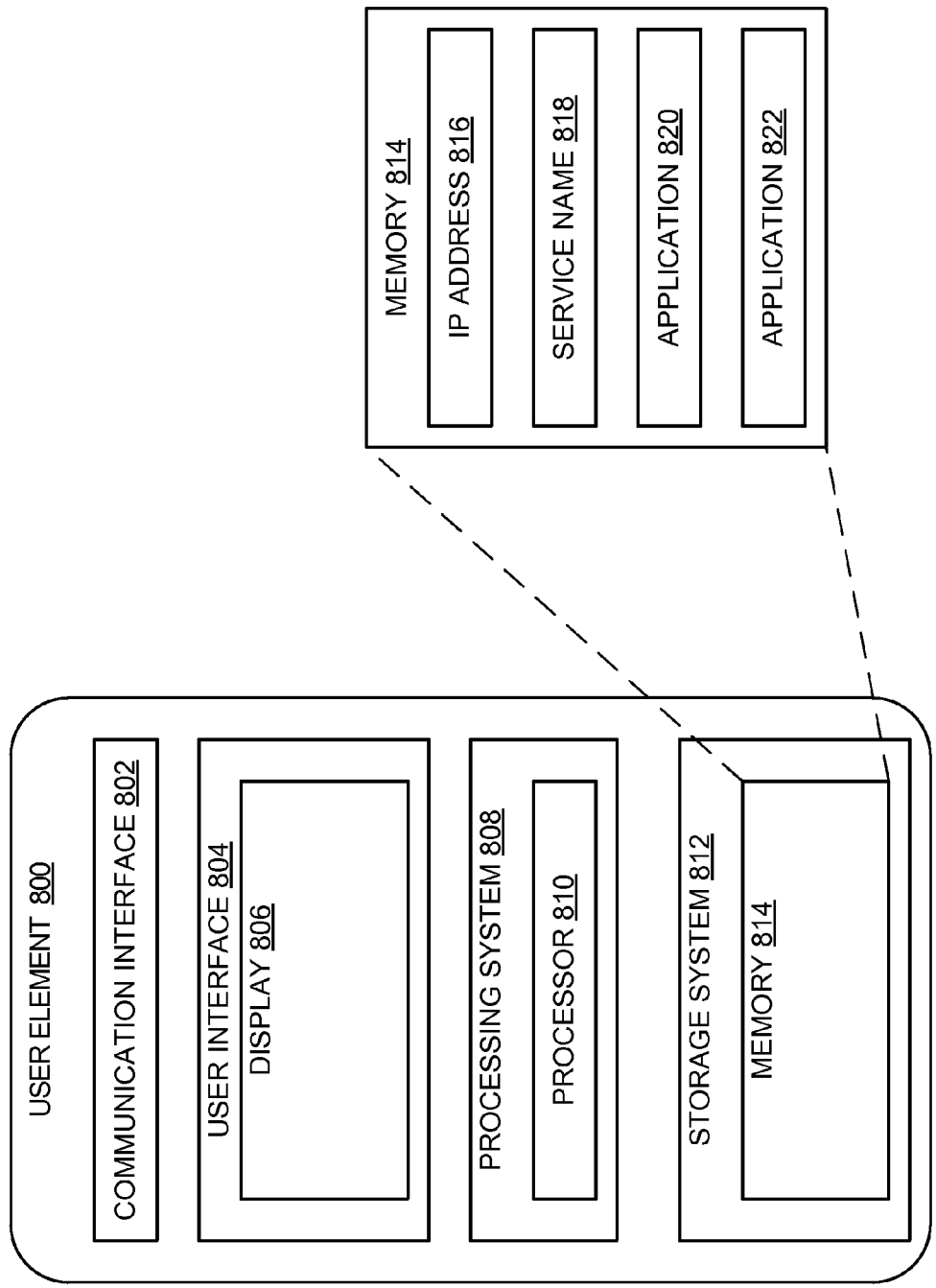

SYSTEMS, METHODS, AND SOFTWARE FOR IMPROVING RESISTANCE TO DISTRIBUTED DENIAL OF SERVICE ATTACKS

TECHNICAL BACKGROUND

Communications networks and systems may be vulnerable to distributed denial of service attacks where one or more user element bombards the network with huge quantities of bogus service requests in an attempt to either cause a system within the network to overload and crash, or to completely overwhelm the system such that valid service requests cannot be processed while the system is busy processing all of the bogus service requests.

Networks may monitor the quantity of service requests arriving from each Internet protocol (IP) address and block IP addresses as needed to mitigate the damage from all of the service requests. However, in distributed attacks, the bogus service requests are typically arriving from many different user elements, some of which may be participating only because they have been compromised and may be used in a so-called man-in-the-middle attack.

Overview

Embodiments disclosed herein provide systems and methods for improving resistance to distributed denial of service attacks within a communications system. In an embodiment, a method provides for handling service attacks in an application server, including detecting a service attack from a user element, receiving a service request from the user element that includes an Internet protocol address, and in response, sending a first name request to the user element for a service name associated with the user element. The method also includes receiving a response to the first name request that includes a service name from the user element, and sending a second name request to a first domain name server for the service name associated with the Internet protocol address of the user element. The method further includes receiving a second response from the first domain name server that includes a stored service name associated with the user element, and comparing the service name to the stored service name to determine whether or not to allow the service request.

In another embodiment, a communications network is provided. This communications network includes a first domain name server configured to receive a request for a service name including an Internet protocol address from a requesting element. In response to the request, the first domain name server is configured to determine the service name based on the Internet protocol address, and to send the service name to the requesting element.

The communications network also includes an application server configured to detect a service attack from a user element, and to receive a service request from the user element that includes an Internet protocol address. In response to the service request, the application server is configured to send a first name request to the user element for a service name associated with the user element, and to receive a first response to the first name request that includes a service name from the user element.

The application server is also configured to send a second name request to a first domain name server for the service name associated with the Internet protocol address of the user element, to receive a second response from the first domain name server that includes a stored service name associated with the user element, and to compare the service name to the stored service name to determine whether or not to allow the service request.

In another embodiment, an apparatus comprising a non-transitory computer-readable storage medium configured to store program instructions, and program instructions stored on the non-transitory computer-readable storage medium is provided. When executed the program instructions direct a processor to detect a service attack from a user element, and to receive a service request from the user element that includes an Internet protocol address.

In response to the service request, the program instructions direct the processor to send a first name request to the user element for a service name associated with the user element, and to receive a first response to the first name request that includes a service name from the user element. The program instructions further direct the processor to send a second name request to a first domain name server for the service name associated with the Internet protocol address of the user element, to receive a second response from the first domain name server that includes a stored service name associated with the user element, and to compare the service name to the stored service name to determine whether or not to allow the service request.

BRIEF DESCRIPTION OF THE DRAWINGS

FIG. 8 illustrates a block diagram of a user element.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
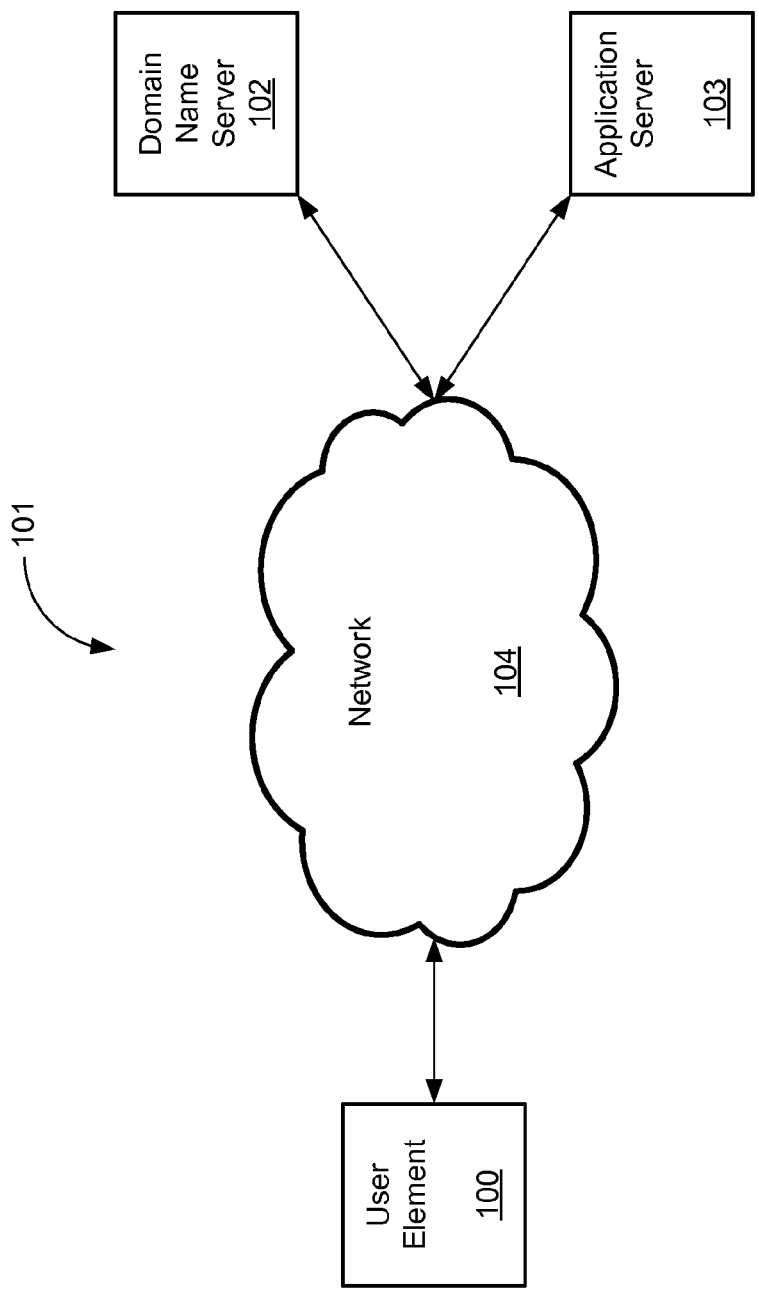
FIG. 1 illustrates a block diagram of a communications system to improve resistance to a distributed denial of service attack.

FIG. 1 illustrates a block diagram of a communications system 101 to improve resistance to a distributed denial of service attack. This example embodiment of a communications system includes user element 100, network 104, domain name server 102, and application server 103. User element 100 is any device capable of communicating with communications system 101, such as mobile phones, laptops, tablets, and the like. Network 104 is any communications network capable of transferring electronic communications from one device to another, such as the Internet, a local area network, and the like.

In operation, user element 100 has been compromised or otherwise involved in participating in a distributed denial of service attack against various elements within or connected to network 104, such as domain name server 102. Here, user element 100 is hitting network 104 with a large number of different service requests each second.

In some cases, it is desired to allow user element 100 to proceed with service requests if it is associated with particular domain name server 102, when, for example, user element 100's services are being provided by the same company that owns domain name server 102. In cases where user element 100 is associated with a different company, it may be desirable to simply block all service requests from user element 100 for a period of time.

In the example illustrated in FIG. 1, user element 100's services are provided by the owner of domain name server 102. Application server 103 has detected a distributed denial of service attack in which user element 100 is participating. Detecting the service attack may include determining when a quantity of traffic (such as service requests) from one or more user elements exceeds a threshold value. When application server 103 receives a service request from user element 100 including an Internet protocol (IP) address, application server 103 determines if user element 100's services are provided by the owner or operator of domain name server 102, and/or application server 103.

In response to the service request from user element 100, application server 103 sends a first name request to user element 100 for a service name associated with user element 100. In this example, user element 100 then sends a request for a service name to domain name server 102 which issues a service name to user element 100 based on the IP address provided by user element 100. In some examples, user element 100 is provided by the owner/operator of domain name server 102 and will be able to store the service name internally, and also be able to provide it upon request. User elements provided by other service providers will not be able to understand the request for a service name and will fail to reply to the request from application server 103.

In one embodiment, the service name comprises the IP address of user element 100 in reverse order and additional information, such as a domain name associated with domain name server 102 and/or application server 103. For example, if user element 100 has an IP address of 70.5.10.2, domain name server 102 may generate a service name of "2.10.5.70-pubpool.companydns.net." User elements provided by other companies will not be able to use this service name, and thus will be blocked by application server 103 and/or domain name server 102.

Application server 103 also sends a second name request to domain name server 102 for the service name associated with the IP address of user element 100. Since domain name server 102 is the same domain name server that user element 100 sent its request to, domain name server 102 will respond to application server 103 with a stored service name for user element 100 that is identical to the service name provided to user element 100.

Application server 103, upon receiving the service name from user element 100 and the stored service name from domain name server 102 compares the two service names to determine whether or not to allow the service request from user element 100. If the service names match, this indicates that user element 100's services are provided by the owner/operator of application server 103 and the service request is allowed. If the service names do not match, this indicates that user element 100 has services provided by a different company and the service request is denied.

Figure 2:
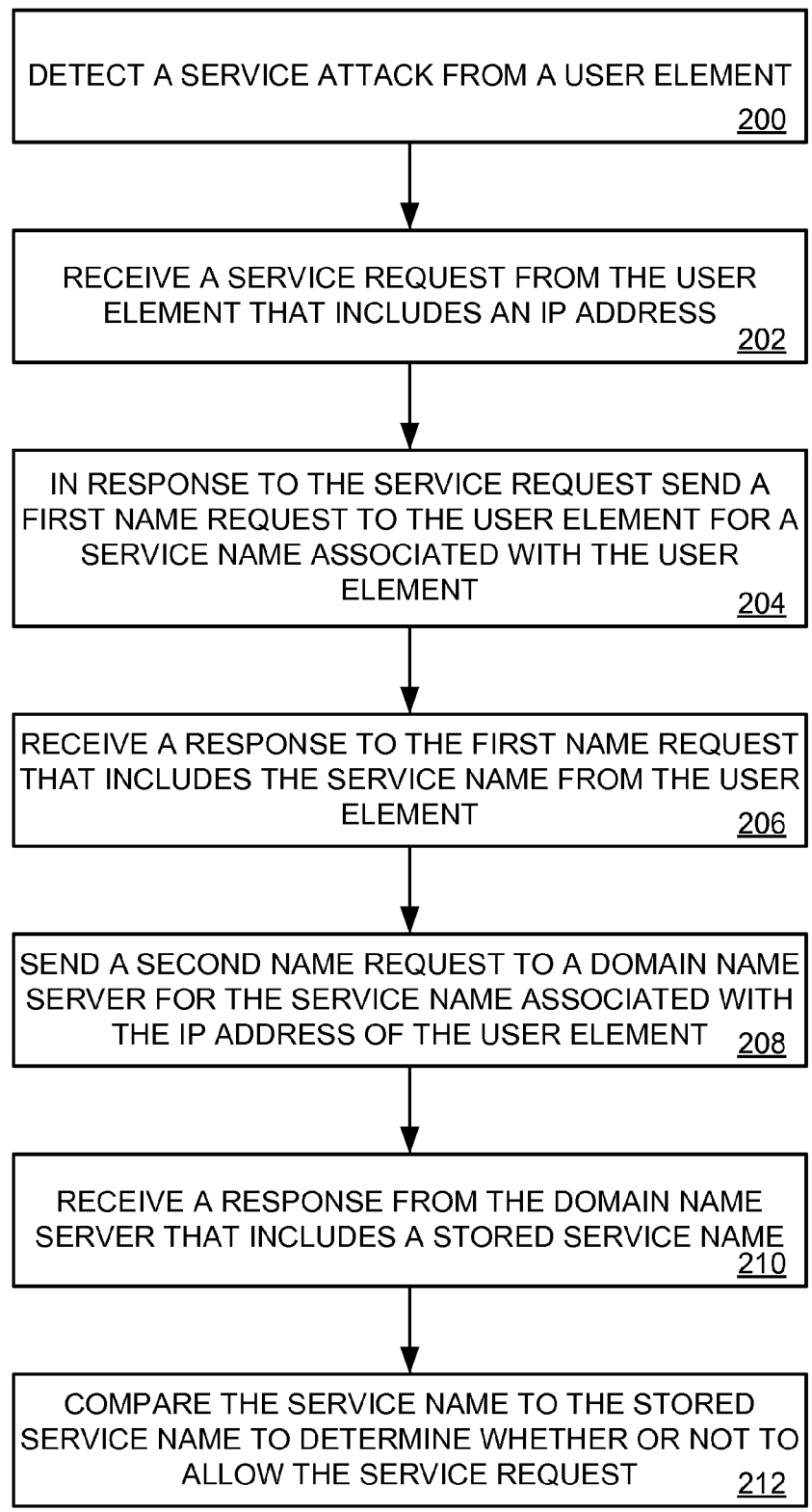
FIG. 2 illustrates the operation of the communications system to improve resistance to distributed denial of service attacks.

FIG. 2 illustrates the operation of communications system 101 to improve resistance to distributed denial of service attacks. In this example method, application server 103 detects a service attack from user element 100, (operation 200). Application server 103 then receives a service request from user element 100 including an IP address for user element 100, (operation 202).

In response to the service request, application server 103 sends a first name request to user element 100 for a service name associated with user element 100, (operation 204). Application server 103 receives a response to the first name request from user element 100 that includes a service name for user element 100, (operation 206).

Application server 103 also sends a second name request to domain name server 102 for the service name associated with the IP address of user element 100, (operation 208). Application server receives a response to the second name request from domain name server 102 that includes a stored service name for user element 100, (operation 210).

Application server 103 compares the service name to the stored service name to determine whether or not to allow the service request from user element 100, (operation 212). If the service name matches the stored service name, application server 103 allows the service request from user element 100. Otherwise, the service request from user element 100 is denied.

Figure 3:
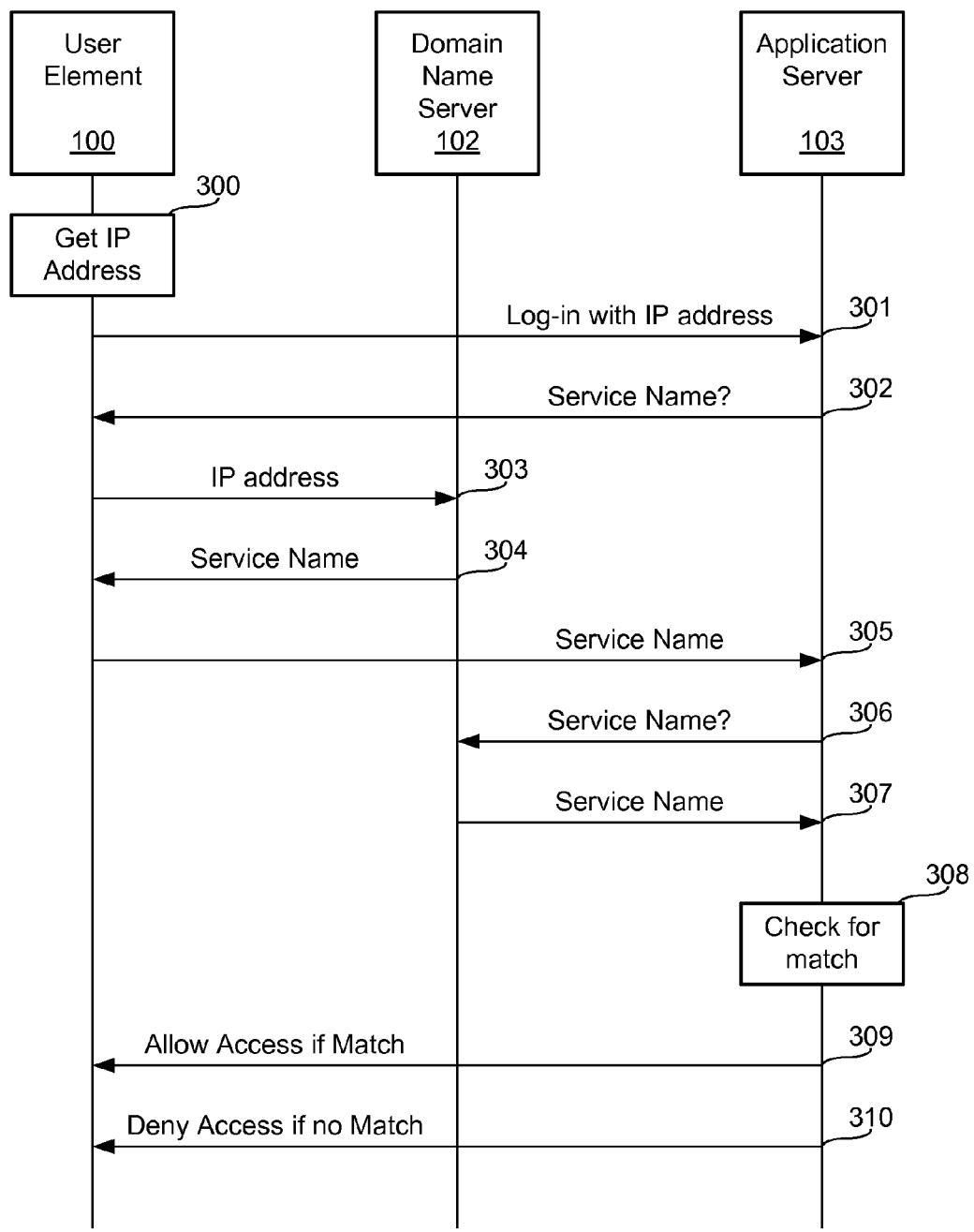
FIG. 3 illustrates the operation of the communications system to improve resistance to distributed denial of service attacks.

FIG. 3 illustrates the operation of communications system 101 to improve resistance to distributed denial of service attacks. In this example, user element 100 gets its IP address, (operation 300), and sends a service request to log-in to application server 103 which includes its IP address, (operation 301). In response, application server 103 sends a request for a service name to user element 100, (operation 302).

User element 100 sends its IP address to domain name server 102 along with a request for a service name, (operation 303). Domain name server 102 responds by sending the service name to user element 100, (operation 304), which user element 100 forwards to application server 103, (operation 305).

Application server 103 sends a second name request for a stored service name for user element 100 to domain name server 102, (operation 306). Domain name server 102 responds by sending the stored service name for user element 100 to application server 103, (operation 307).

Application server 103 compares the service name received from user element 100 to the stored service name received from domain name server 102, (operation 308). If the service name matches the stored service name, application server 103 allows access to user element 100, (operation 309). If the service name does not match the stored service name, application server 103 denies access to user element 100, (operation 310).

Figure 4:
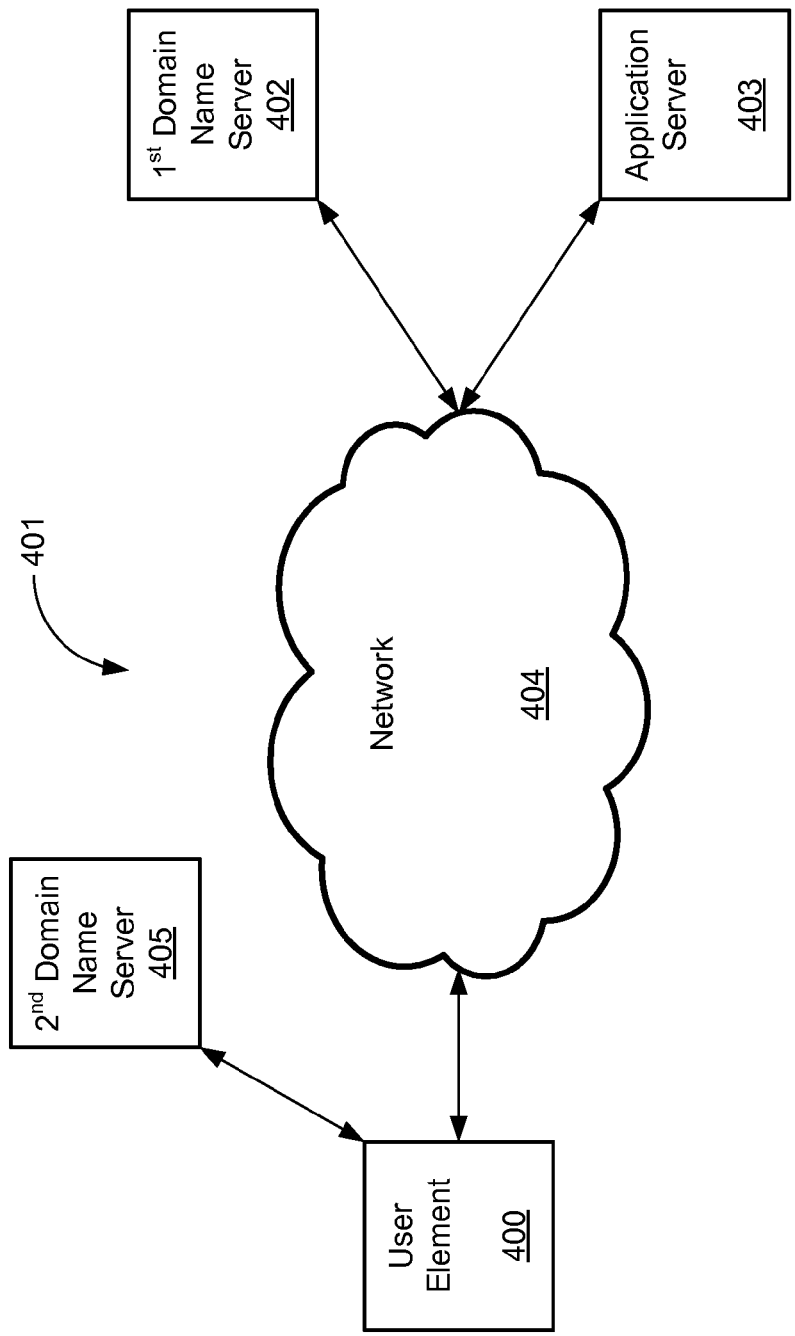
FIG. 4 illustrates a block diagram of a communications system undergoing a distributed denial of service attack.

FIG. 4 illustrates communications system 401 undergoing a distributed denial of service attack. In this example embodiment, a communications system comprises user element 400, network 404, application server 403, first domain name server 402, and second domain name server 405. Here, user element 400's services are not provided by the owner/operator of application server 403 and/or first domain name server 402.

Here application server 403 has detected a distributed denial of service attack in which user element 400 is participating. Upon receiving a service request including an IP address from user element 400, application server 403 sends a first name request to user element 400 for a service name associated with user element 400.

User element 400 may return an error message to application server 403 if it does not understand the request, at which point application server 403 will deny the service request from user element 400. Otherwise, user element 400 sends a request for a service name to second domain name server 405, which will either return an error or a service name to user element 400. Since user element 400 is using a different domain name server than application server 403, this second domain name server 405 will provide a service name different from that which would be provided by first domain name server 402. User element 400 forwards the service name from second domain name server 405 to application server 403.

Application server 403 sends a second name request to first domain name server 402 for a stored service name for user element 400 based on the IP address of user element 400. First domain name server 402 sends a stored service name for user element 400 to application server 403, which then compares the service name received from user element 400 to the stored service name received from first domain name server 402. Since the service name received from user element 400 does not match the stored service name received from first domain name server 402, application server 403 denies the service request from user element 400.

Figure 5:
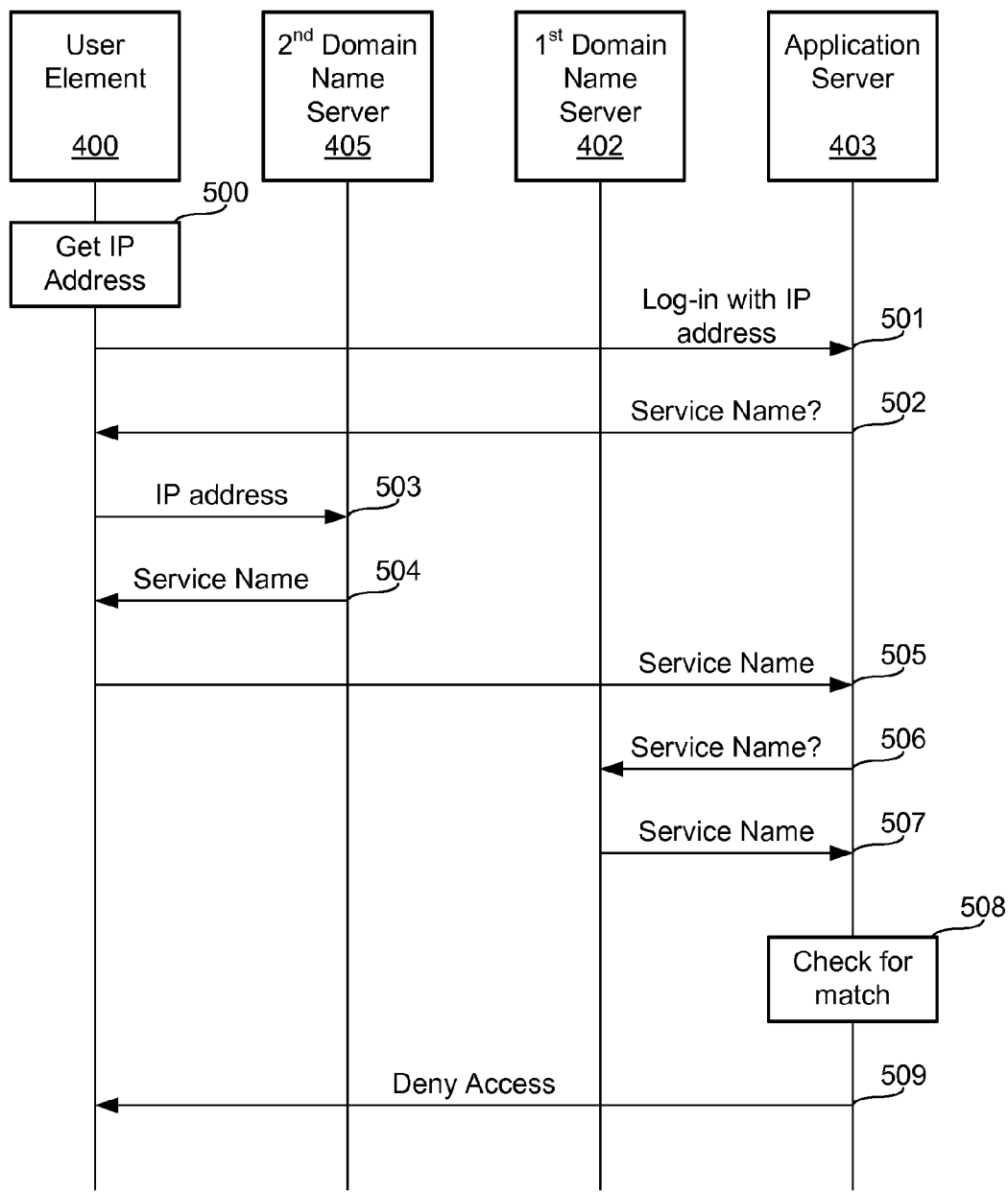
FIG. 5 illustrates the operation of the communications system undergoing a distributed denial of service attack.

FIG. 5 illustrates the operation of communications system 401 undergoing a distributed denial of service attack. In this example, user element 400 gets its IP address, (operation 500), and sends a service request to log-in to application server 403 which includes its IP address, (operation 501). In response, application server 403 sends a request for a service name to user element 400, (operation 502).

User element 400 sends its IP address to second domain name server 405 along with a request for a service name, (operation 503). Second domain name server 405 responds by sending the service name to user element 400, (operation 504), which user element 400 forwards to application server 403, (operation 505).

Application server 403 sends a second name request for a stored service name for user element 400 to first domain name server 402, (operation 506). First domain name server 402 responds by sending the stored service name for user element 400 to application server 403, (operation 507).

Application server 403 compares the service name received from user element 400 to the stored service name received from first domain name server 402, (operation 508). Since the service name does not match the stored service name, application server 403 denies access to user element 400, (operation 509).

Figure 6:
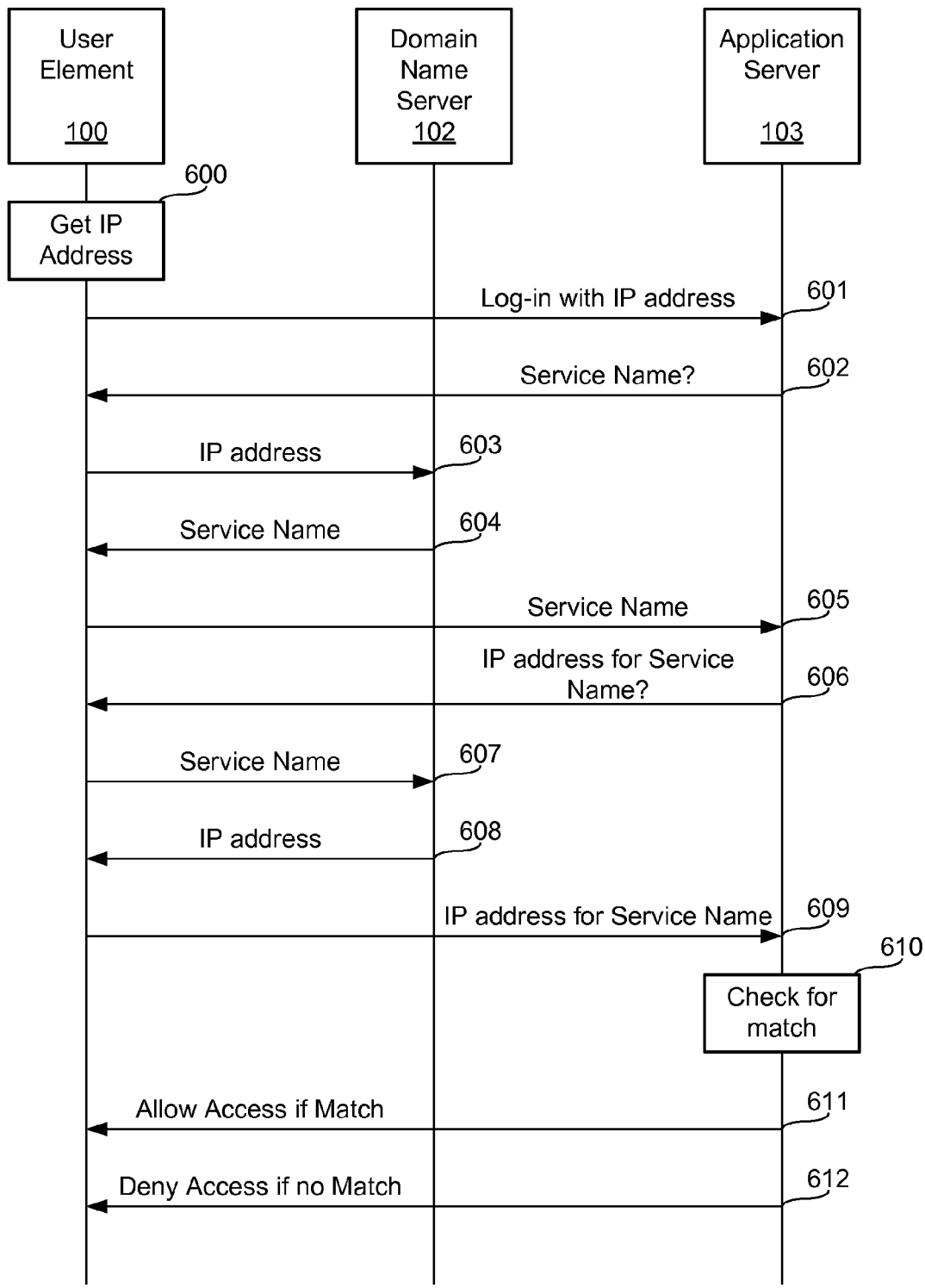
FIG. 6 illustrates the operation of the communications system undergoing a distributed denial of service attack.

FIG. 6 illustrates the operation of communications system 101 undergoing a distributed denial of service attack. In this alternative embodiment, user element 100 gets its IP address, (operation 600), and sends a service request to log-in to application server 103 which includes its IP address, (operation 601). In response, application server 103 sends a request for a service name to user element 100, (operation 602).

User element 100 sends its IP address to domain name server 102 along with a request for a service name, (operation 603). Domain name server 102 responds by sending the service name to user element 100, (operation 604), which user element 100 forwards to application server 103, (operation 605).

Application server 103 sends a request for an IP address associated with the service name to user element 100, (operation 606). In response, user element 100 sends its service name to domain name server 102 along with a request for an IP address associated with the service name, (operation 607). Domain name server 102 responds by sending the IP address to user element 100, (operation 608).

User element 100 forwards the IP address associated with the service name to application server 103, (operation 609). Application server 103 then checks to see if the two IP address match, (operation 610). If the IP addresses match, application server 103 allows access to user element 100, (operation 611). If the IP addresses do not match, application server denies access to user element 100, (operation 612).

Figure 7:
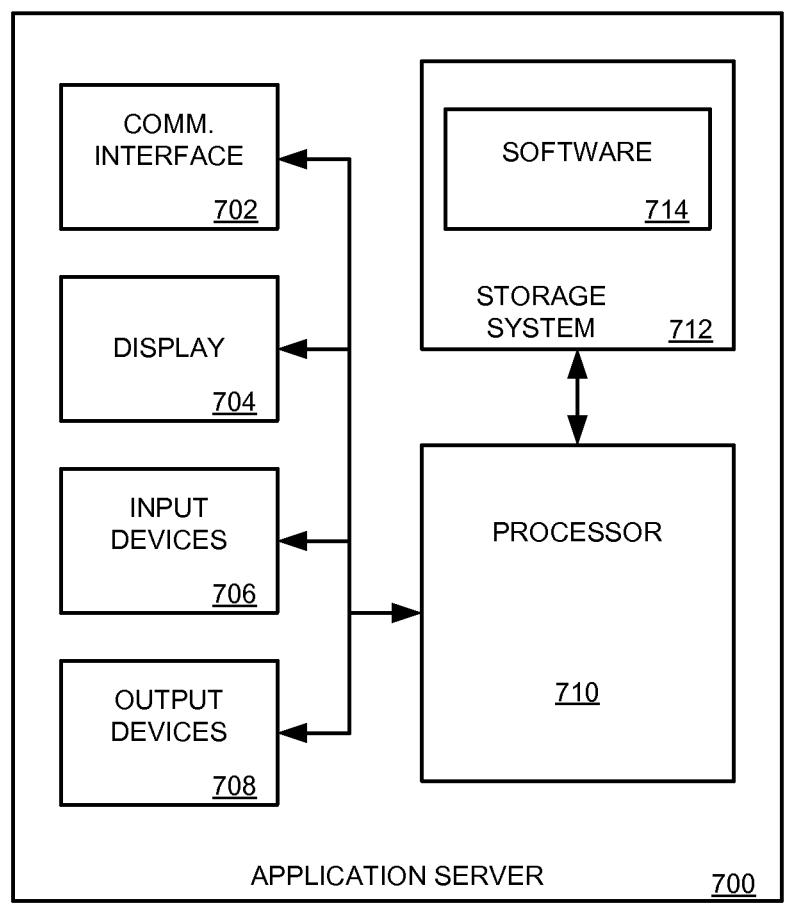
FIG. 7 illustrates a block diagram of an application server.

FIG. 7 illustrates application server 700 to improve resistance to distributed denial of service attacks. The method illustrated in FIG. 2 is implemented on one or more application servers 700, as shown in FIG. 1. Application server 700 includes communication interface 702, display 704, input devices 706, output devices 708, processor 710, and storage system 712. Processor 710 is linked to communication interface 702, display 704, input devices 706, output devices 708, and storage system 712. Storage system 712 includes a non-transitory memory device that stores operating software 714.

Communication interface 702 includes components that communicate over communication links, such as network cards, ports, RF transceivers, processing circuitry and software, or some other communication devices. Communication interface 702 may be configured to communicate over metallic, wireless, or optical links. Communication interface 702 may be configured to use TDM, IP, Ethernet, optical networking, wireless protocols, communication signaling, or some other communication format—including combinations thereof.

Display 704 may be any type of display capable of presenting information to a user. Display 704 may include touch screens in some embodiments. Input devices 706 include any device capable of capturing user inputs and transferring them to application server 700. Input devices 706 may include a keyboard, mouse, touch pad, or some other user input apparatus. Output devices 708 include any device capable of transferring outputs from application server 700 to a user. Output devices 708 may include printers, projectors, displays, or some other user output apparatus. Display 704, input devices 706, and output devices 708 may be external to application server 700 or omitted in some examples.

Processor 710 includes a microprocessor and other circuitry that retrieves and executes operating software 714 from storage system 712. Storage system 712 includes a disk drive, flash drive, data storage circuitry, or some other non-transitory memory apparatus. Operating software 714 includes computer programs, firmware, or some other form of machine-readable processing instructions. Operating software 714 may include an operating system, utilities, drivers, network interfaces, applications, or some other type of software. When executed by processing circuitry, operating software 714 directs processor 710 to operate application server 700 according to the method illustrated in FIG. 2.

In this example, application server 700 executes a number of methods stored as software 714 within storage system 712. The results of these methods are displayed to a user via display 704, or output devices 708. Input devices 706 allow a plurality of communications network elements to send communication data to application server 700.

FIG. 8 illustrates a block diagram of user element 800. User element 800 is an example of user elements 101 and 401 from FIGS. 1 and 4, although user elements 101 and 401 may user alternative configurations and operations. User element 800 includes communication interface 802, user interface 804, processing system 808, and storage system 812. Processing system 808 is linked to communication interface 802, user interface 804, and storage system 812. Storage system 812 includes a non-transitory memory device 814 that stores various data and software.

Communication interface 802 includes components that communicate over communication links, such as network cards, ports, RF transceivers, processing circuitry and software, or some other communication devices. Communication interface 802 may be configured to communicate over metallic, wireless, or optical links. Communication interface 802 may be configured to use TDM, IP, Ethernet, optical networking, wireless protocols, communication signaling, or some other communication format—including combinations thereof. When configured for wireless protocols, communication interface 802 may use various communication formats, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

User interface 804 includes display 806. Display 806 may be any type of display capable of presenting information to a user. Display 806 may include touch screens in some embodiments.

Processing system 808 includes processor 810. Processor 810 includes a microprocessor and other circuitry that retrieves and executes software from storage system 812. Storage system 812 includes a disk drive, flash drive, data storage circuitry, or some other non-transitory memory apparatus. Software within memory 814 includes computer programs, firmware, or some other form of machine-readable processing instructions. The software may include an operating system, utilities, drivers, network interfaces, applications, or some other type of software. When executed by processor 810, the software directs processor 810 to operate user element 800 according to the method illustrated in FIG. 2.

In this example embodiment, memory 814 includes IP address 816, service name 818, application 820, and application 822. In this example, user element 800 executes a number of methods stored as within storage system 812 such as application 820 and application 822. The results of these methods are displayed to a user via display 806.

When user element 800 has been compromised, rogue applications may be stored in memory 814 without the knowledge or consent of the user. These rogue applications may participate in a distributed denial of service attack against one or more elements within a communications system or network, such as in the situations illustrated in FIGS. 1 and 4.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for handling service attacks in an application server, the method comprising:
   detecting a service attack from a user element;
   receiving a service request from the user element that includes an Internet protocol address;
   in response to the service request, sending a first name request to the user element for a service name associated with the user element, wherein, responsive to the first name request, the user element sends a service name request to a first domain name server, and in response, the first domain name server determines the service name associated with the user element based on the Internet protocol address of the user element and returns the service name to the user element;
   receiving a response to the first name request that includes the service name from the user element;
   sending a second name request to the first domain name server for a stored service name associated with the Internet protocol address of the user element;
   receiving a second response from the first domain name server that includes the stored service name associated with the user element; and
   comparing the service name to the stored service name to determine whether or not to allow the service request.

2. The method of claim 1, further comprising:
   allowing the service request when the service name matches the stored service name.

3. The method of claim 1, further comprising:
   denying the service request when the service name does not match the stored service name.

4. The method of claim 1, wherein detecting the service attack from the user element comprises detecting when a quantity of traffic from the user element exceeds a threshold value.

5. The method of claim 1, wherein in response to receiving the service name from the first domain name server, the user element stores the service name internally.

6. The method of claim 1, wherein the user element and the first domain name server are associated with a same service provider.

7. The method of claim 1, wherein the service name comprises the Internet protocol address of the user element in reverse order.

8. A communications network comprising:
   a first domain name server; and
   an application server configured to:
      detect a service attack from a user element;
      receive a service request from the user element that includes an Internet protocol address;
      in response to the service request, send a first name request to the user element for a service name associated with the user element, wherein, responsive to the first name request, the user element sends a service name request to the first domain name server;
   the first domain name server configured to, in response to the first name request, determine the service name associated with the user element based on the Internet protocol address of the user element and return the service name to the user element;
   the application server further configured to:
      receive a first response to the first name request that includes the service name from the user element;
      send a second name request to the first domain name server for a stored service name associated with the Internet protocol address of the user element;
      receive a second response from the first domain name server that includes the stored service name associated with the user element; and
      compare the service name to the stored service name to determine whether or not to allow the service request.

9. The communications network of claim 8, wherein the application server is further configured to:
   allow the service request when the service name matches the stored service name.

10. The communications network of claim 8, wherein the application server is further configured to:
  deny the service request when the service name does not match the stored service name.

11. The communications network of claim 8, wherein detecting the service attack from the user element comprises detecting when a quantity of traffic from the user element exceeds a threshold value.

12. The communications network of claim 8, wherein in response to receiving the service name from the first domain name server, the user element stores the service name internally.

13. The communications network of claim 8, wherein the user element and the first domain name server are associated with a same service provider.

14. The communications network of claim 8, wherein the service name comprises the Internet protocol address of the user element in reverse order.

15. An apparatus comprising:
  a non-transitory computer-readable storage medium configured to store program instructions; and
  the program instructions stored on the non-transitory computer-readable storage medium configured to direct a processor to:
    detect a service attack from a user element;
    receive a service request from the user element that includes an Internet protocol address;
    in response to the service request, send a first name request to the user element for a service name associated with the user element, wherein, responsive to the first name request, the user element sends a service name request to a first domain name server, and in response, the first domain name server determines the service name associated with the user element based on the Internet protocol address of the user element and returns the service name to the user element;
    receive a first response to the first name request that includes the service name from the user element;
    send a second name request to the first domain name server for a stored service name associated with the Internet protocol address of the user element;
    receive a second response from the first domain name server that includes the stored service name associated with the user element; and
    compare the service name to the stored service name to determine whether or not to allow the service request.

16. The apparatus of claim 15, wherein the program instructions stored on the non-transitory computer-readable storage medium further direct the processor to:
  allow the service request when the service name matches the stored service name.

17. The apparatus of claim 15, wherein the program instructions stored on the non-transitory computer-readable storage medium further direct the processor to:
  deny the service request when the service name does not match the stored service name.

18. The apparatus of claim 15, wherein detecting the service attack from the user element comprises detecting when a quantity of traffic from the user element exceeds a threshold value.

19. The apparatus of claim 15, wherein the user element and the first domain name server are associated with a same service provider.

20. The apparatus of claim 15, wherein the service name comprises the Internet protocol address of the user element in reverse order.

* * * * *